(12) United States Patent
Solheim et al.

(10) Patent No.: US 9,514,191 B2
(45) Date of Patent: Dec. 6, 2016

(54) VISUALIZING RANKING FACTORS FOR ITEMS IN A SEARCH RESULT LIST

(71) Applicant: Microsoft Technology Licensing, LLC, Redmond, WA (US)

(72) Inventors: Helge Grenager Solheim, Oslo (NO); Anders Fagerhaug, Asker (NO); John Hartley Toews, Oslo (NO); Sarah Brodwall, Oslo (NO); Rune Djurhuus, Oslo (NO); Dmitry Shaporenkov, Kongsberg (NO); Morgan Larsson, Asker (NO); Lucian Baciu, Oslo (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 93 days.

(21) Appl. No.: 13/802,734

(22) Filed: Mar. 14, 2013

(65) Prior Publication Data

US 2014/0280080 A1    Sep. 18, 2014

(51) Int. Cl.
*G06F 17/30* (2006.01)
*G06F 7/00* (2006.01)

(52) U.S. Cl.
CPC ..... *G06F 17/3053* (2013.01); *G06F 17/30867* (2013.01)

(58) Field of Classification Search
CPC .............. G06F 17/3005; G06F 17/30058
USPC .................................. 707/723, 722
See application file for complete search history.

(56) References Cited

U.S. PATENT DOCUMENTS

| | | | |
|---|---|---|---|
| 6,434,556 B1 * | 8/2002 | Levin et al. ........... 707/999.003 |
| 7,055,168 B1 * | 5/2006 | Errico et al. ..................... 725/46 |
| 7,640,236 B1 * | 12/2009 | Pogue ..................... 707/999.003 |
| 7,761,447 B2 | 7/2010 | Brill et al. |
| 7,783,630 B1 | 8/2010 | Chevalier et al. |
| 7,945,571 B2 | 5/2011 | Wanker |
| 7,958,116 B2 | 6/2011 | House et al. |
| 8,266,144 B2 | 9/2012 | Tankovich et al. |
| 8,341,017 B2 | 12/2012 | Payne et al. |
| 8,346,765 B2 | 1/2013 | Guo et al. |
| 8,812,947 B1 * | 8/2014 | Maoz .................... G06F 17/246 715/212 |
| 8,825,649 B2 * | 9/2014 | Heimendinger .. G06F 17/30522 707/737 |
| 8,874,550 B1 * | 10/2014 | Soubramanien .. G06F 17/30572 707/708 |
| 2002/0038299 A1 * | 3/2002 | Zernik ............. G06F 17/30017 707/999.003 |
| 2003/0071814 A1 * | 4/2003 | Jou ......................... G06F 9/542 345/440 |
| 2004/0267736 A1 * | 12/2004 | Yamane et al. .................... 707/3 |
| 2005/0278321 A1 * | 12/2005 | Vailaya et al. .................... 707/3 |
| 2005/0278325 A1 * | 12/2005 | Mihalcea .............. G06F 17/277 707/999.006 |
| 2006/0123014 A1 | 6/2006 | Ng |

(Continued)

OTHER PUBLICATIONS

Kelly, et al., "The Effects of Topic Familiarity on Information Search Behavior", Retrieved at <<http://www.ils.unc.edu/~dianek/kelly-jcdl02.pdf>>, Joint Conference on Digital Libraries, Portland, Oregon, USA, Jul. 13, 2002, pp. 2.
Fan, et al., "Tuning Before Feedback: Combining Ranking Discovery and Blind Feedback for Robust Retrieval", Retrieved at <<http://filebox.vt.edu/users/wfan/paper/ARRANGER/p52-Fan.pdf>>, 27th annual international ACM SIGIR conference on Research and development in information retrieval, Jul. 25, 2004, pp. 8.

(Continued)

*Primary Examiner* — Pavan Mamillapalli
(74) *Attorney, Agent, or Firm* — Julie Kane Akhter; Tom Wong; Micky Minhas

(57) ABSTRACT

A method, system, and one or more computer-readable storage media for visualizing ranking factors for items in a search result list are provided herein. The method includes generating a search result list for a query and generating a visualization of one or more ranking factors for each of a number of items in the search result list.

19 Claims, 8 Drawing Sheets

(56) References Cited

U.S. PATENT DOCUMENTS

| | | | |
|---|---|---|---|
| 2007/0162443 A1* | 7/2007 | Liu | G06F 17/30991 707/999.005 |
| 2008/0016053 A1 | 1/2008 | Frieden et al. | |
| 2008/0086344 A1* | 4/2008 | Martini | G06Q 10/0637 705/7.36 |
| 2010/0063878 A1* | 3/2010 | Bachet | G06Q 30/0251 705/14.49 |
| 2012/0221566 A1 | 8/2012 | Iwasa et al. | |
| 2012/0254790 A1* | 10/2012 | Colombino et al. | 715/781 |
| 2012/0296918 A1 | 11/2012 | Morris et al. | |
| 2013/0041896 A1* | 2/2013 | Ghani et al. | 707/732 |
| 2014/0156652 A1* | 6/2014 | Abiola | G06F 17/3053 707/723 |

OTHER PUBLICATIONS

"International Search Report & Written Opinion for PCT Patent Application No. PCT/US2014/020952", Mailed Date: Apr. 29, 2014, Filed Date: Mar. 6, 2014, 9 Pages.

Fox, Vanessa, "Marketing in the Age of Google", John Wiley & Sons, Mar. 8, 2012, 3 Pages.

"Second Written Opinion Issued in PCT Application No. PCT/US2014/020952", Mailed Date: Feb. 2, 2015, 6 Pages.

Liang, et al., "Highlighting in Information Visualization: A Survey", In Proceedings of 14th International Conference Information Visualisation, Jul. 26, 2010, pp. 79-85.

* cited by examiner

Familiarity

Popularity

Freshness

Authority

Social Cues

Personalness

Date

Match

400

506

800

VISUALIZING RANKING FACTORS FOR ITEMS IN A SEARCH RESULT LIST

BACKGROUND

Queries are widely used to identify specific information relating to particular search terms or keywords. For example, a user may execute a query including particular search terms or keywords, and a search result list including a number of items corresponding to the search terms or keywords may be generated. In most cases, the search result list includes the title, the uniform resource locator (URL), and a short snippet of the content of each search result item. However, this information alone does not provide the user with an explanation of the content or ordering of the search results list. For example, it may be difficult for the user to determine why the items in the search result list were chosen over hundreds of thousands of other potentially matching items. Furthermore, although the user is often able to use filters to narrow the search result list, the user typically does not have the ability to adjust the ranking calculations used to score the items and determine the order of the items in the search result list. Instead, the ranking calculations are hidden from the user and are never explained to the user in any way.

SUMMARY

The following presents a simplified summary of the subject innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

An embodiment provides a method for visualizing ranking factors for items in a search result list. The method includes generating a search result list for a query and generating a visualization of one or more ranking factors for each of a number of items in the search result list.

Another embodiment provides a computing system for visualizing ranking factors for items in a search result list. The computing system includes a processor that is adapted to execute stored instructions, a display device, and a system memory. The system memory includes code configured to generate a search result list in response to an input of a query by a user, generate a visualization of one or more ranking factors for each of a number of items in the search result list, and display the visualization to the user via the display device.

In addition, another embodiment provides one or more computer-readable storage media for storing computer-readable instructions. The computer-readable instructions provide a system for visualizing ranking factors for items in a search result list when executed by one or more processing devices. The computer-readable instructions include code configured to generate a search result list for a query. The search result includes a number of items that are ordered based on a weight of one or more ranking factors corresponding to each of the items. The computer-readable instructions also include code configured to generate a visualization of the one or more ranking factors for each of the items in the search result list based on a visibility threshold for each of the one or more ranking factors.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

As discussed above, current techniques for executing queries do not provide the user with an explanation of the content or ordering of the search results lists for the queries. Accordingly, embodiments described herein are directed to the visualization of ranking factors that are used to determine items to be included in a search result list, as well as the ordering of the items in the search result list. Specifically, embodiments described herein provide the user with a visualization of the most relevant ranking factors for each item (or group of items) in a search result list. The visualization of the ranking factors may be provided via labels, graphical symbols, such as icons, or graphs, for example.

Embodiments described herein also provide for the determination of the specific ranking factors that are to be displayed to the user based on tunable visibility thresholds corresponding to the ranking factors. For example, in some embodiments, the user is able to tune the visibility threshold for each ranking factor. Tuning the visibility thresholds for the ranking factors may change the manner in which the ranking factors are displayed to the user without affecting the ranking calculations or the actual ordering of the items in the search result list. In addition, in some embodiments, the user is able to modify the ranking calculations by changing the weights of the ranking factors. This may result in a change in the ordering of the items in the search result list.

As used herein, the term "item" refers to any type of document, image, file, email or the like that may be returned in response to the execution of a query. In some embodiments, the query is executed over the World Wide Web via a search engine. In other embodiments, the query is executed within a particular computing environment or networking environment via any suitable type of search function or application.

Figure 1:
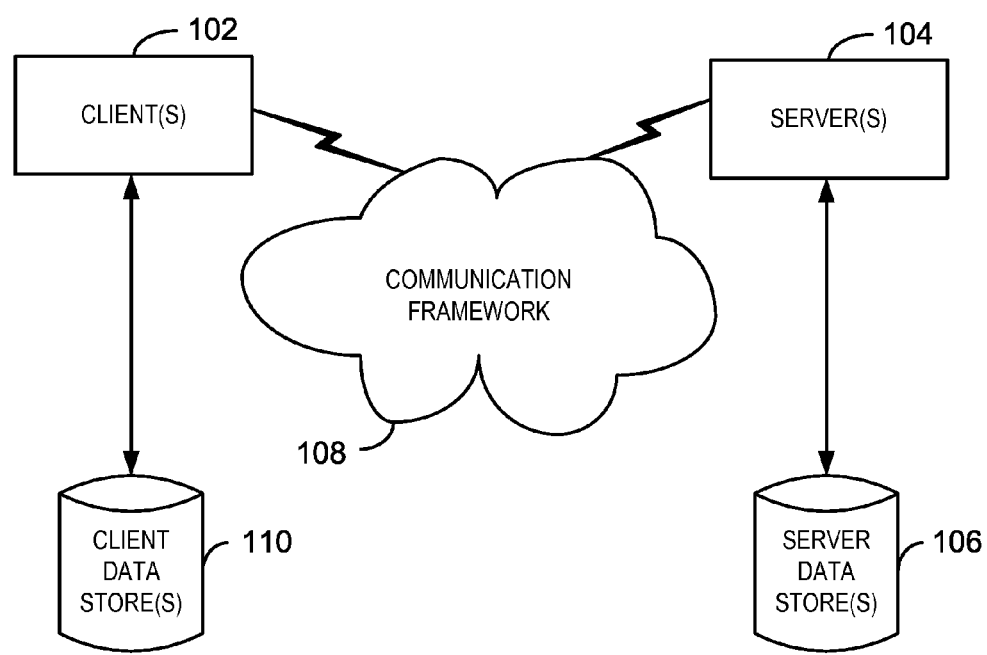
FIG. 1 is a block diagram of a networking environment in which a system and method for visualizing ranking factors for items in a search result list may be implemented.

As a preliminary matter, some of the figures describe concepts in the context of one or more structural components, variously referred to as functionality, modules, features, elements, or the like. The various components shown in the figures can be implemented in any manner, such as via software, hardware (e.g., discrete logic components), firmware, or any combinations thereof. In some embodiments, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1, discussed below, provides details regarding one system that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, manual processing, or the like. As used herein, hardware may include computer systems, discrete logic components, such as application specific integrated circuits (ASICs), or the like.

As to terminology, the phrase "configured to" encompasses any way that any kind of functionality can be constructed to perform an identified operation. The functionality can be configured to perform an operation using, for instance, software, hardware, firmware, or the like.

The term "logic" encompasses any functionality for performing a task. For instance, each operation illustrated in the flowcharts corresponds to logic for performing that operation. An operation can be performed using, for instance, software, hardware, firmware, or the like.

As used herein, the terms "component," "system," "client," "search engine," "browser," "server," and the like are intended to refer to a computer-related entity, either hardware, software (e.g., in execution), or firmware, or any combination thereof. For example, a component can be a process running on a processor, an object, an executable, a program, a function, a library, a subroutine, a computer, or a combination of software and hardware.

By way of illustration, both an application running on a server and the server can be a component. One or more components can reside within a process, and a component can be localized on one computer and/or distributed between two or more computers. The term "processor" is generally understood to refer to a hardware component, such as a processing unit of a computer system.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable storage device or media.

Computer-readable storage media can include but are not limited to magnetic storage devices (e.g., hard disk, floppy disk, and magnetic strips, among others), optical disks (e.g., compact disk (CD) and digital versatile disk (DVD), among others), smart cards, and flash memory devices (e.g., card, stick, and key drive, among others). In contrast, computer-readable media (i.e., not storage media) generally may additionally include communication media such as transmission media for wireless signals and the like.

Figure 2:
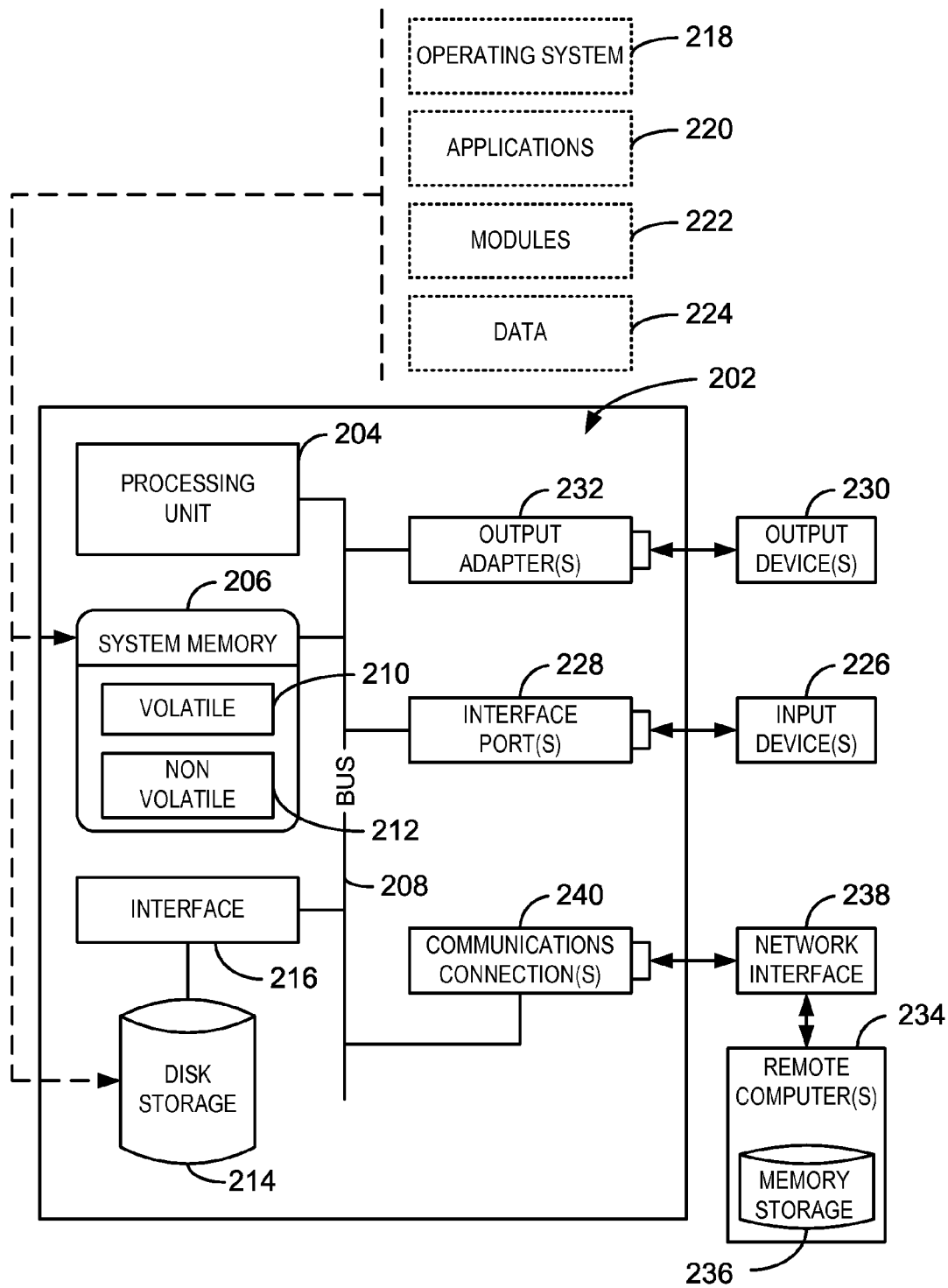
FIG. 2 is a block diagram of a computing environment that may be used to implement a system and method for visualizing ranking factors for items in a search result list.

In order to provide context for implementing various aspects of the claimed subject matter, FIGS. 1-2 and the following discussion are intended to provide a brief, general description of a computing environment in which the various aspects of the subject innovation may be implemented. For example, a method and system for visualizing ranking factors for items in a search result list can be implemented in such a computing environment. While the claimed subject matter has been described above in the general context of computer-executable instructions of a computer program that runs on a local computer or remote computer, those of skill in the art will recognize that the subject innovation also may be implemented in combination with other program modules. Generally, program modules include routines, programs, components, data structures, or the like that perform particular tasks or implement particular abstract data types.

Moreover, those of skill in the art will appreciate that the subject innovation may be practiced with other computer system configurations. For example, the subject innovation may be practiced with single-processor or multi-processor computer systems, minicomputers, mainframe computers, personal computers, hand-held computing systems, microprocessor-based or programmable consumer electronics, or the like, each of which may operatively communicate with one or more associated devices. The illustrated aspects of the claimed subject matter may also be practiced in distributed computing environments wherein certain tasks are performed by remote processing devices that are linked through a communications network. However, some, if not all, aspects of the subject innovation may be practiced on stand-alone computers. In a distributed computing environment, program modules may be located in local or remote memory storage devices.

FIG. 1 is a block diagram of a networking environment 100 in which a system and method for visualizing ranking factors for items in a search result list may be implemented. The networking environment 100 includes one or more client(s) 102. The client(s) 102 can be hardware and/or software (e.g., threads, processes, or computing systems). The networking environment 100 also includes one or more server(s) 104. The server(s) 104 can be hardware and/or software (e.g., threads, processes, or computing systems). The server(s) 104 can house threads to perform search operations by employing the subject innovation, for example.

One possible communication between a client 102 and a server 104 can be in the form of a data packet adapted to be transmitted between two or more computer processes. The networking environment 100 includes a communication framework 108 that can be employed to facilitate communications between the client(s) 102 and the server(s) 104. The client(s) 102 are operably connected to one or more client data store(s) 110 that can be employed to store information local to the client(s) 102. The client data store(s) 110 may be stored in the client(s) 102, or may be located remotely, such as in a cloud server. Similarly, the server(s)

104 are operably connected to one or more server data store(s) 106 that can be employed to store information local to the servers 104.

FIG. 2 is a block diagram of a computing environment 200 that may be used to implement a system and method for visualizing ranking factors for items in a search result list. The computing environment 200 includes a computer 202. The computer 202 includes a processing unit 204, a system memory 206, and a system bus 208. The system bus 208 couples system components including, but not limited to, the system memory 206 to the processing unit 204. The processing unit 204 can be any of various available processors. Dual microprocessors and other multiprocessor architectures also can be employed as the processing unit 204.

The system bus 208 can be any of several types of bus structures, including the memory bus or memory controller, a peripheral bus or external bus, or a local bus using any variety of available bus architectures known to those of ordinary skill in the art. The system memory 206 is computer-readable storage media that includes volatile memory 210 and non-volatile memory 212. The basic input/output system (BIOS), containing the basic routines to transfer information between elements within the computer 202, such as during start-up, is stored in non-volatile memory 212. By way of illustration, and not limitation, non-volatile memory 212 can include read-only memory (ROM), programmable ROM (PROM), electrically-programmable ROM (EPROM), electrically-erasable programmable ROM (EEPROM), or flash memory.

Volatile memory 210 includes random access memory (RAM), which acts as external cache memory. By way of illustration and not limitation, RAM is available in many forms, such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 202 also includes other computer-readable storage media, such as removable/non-removable, volatile/non-volatile computer storage media. FIG. 2 shows, for example, a disk storage 214. Disk storage 214 may include, but is not limited to, a magnetic disk drive, floppy disk drive, tape drive, Jaz drive, Zip drive, LS-100 drive, flash memory card, or memory stick.

In addition, disk storage 214 can include storage media separately or in combination with other storage media including, but not limited to, an optical disk drive such as a compact disk ROM device (CD-ROM), CD recordable drive (CD-R Drive), CD rewritable drive (CD-RW Drive), or a digital versatile disk ROM drive (DVD-ROM). To facilitate connection of the disk storage 214 to the system bus 208, a removable or non-removable interface is typically used, such as interface 216.

It is to be appreciated that FIG. 2 describes software that acts as an intermediary between users and the basic computer resources described in the computing environment 200. Such software includes an operating system 218. The operating system 218, which can be stored on disk storage 214, acts to control and allocate resources of the computer 202.

System applications 220 take advantage of the management of resources by the operating system 218 through program modules 222 and program data 224 stored either in system memory 206 or on disk storage 214. It is to be appreciated that the claimed subject matter can be implemented with various operating systems or combinations of operating systems.

A user enters commands or information into the computer 202 through input devices 226. Input devices 226 can include, but are not limited to, a pointing device (such as a mouse, trackball, stylus, or the like), a keyboard, a microphone, a gesture or touch input device, a voice input device, a joystick, a satellite dish, a scanner, a TV tuner card, a digital camera, a digital video camera, a web camera, or the like. The input devices 226 connect to the processing unit 204 through the system bus 208 via interface port(s) 228. Interface port(s) 228 can include, for example, a serial port, a parallel port, a game port, and a universal serial bus (USB). Output device(s) 230 may also use the same types of ports as input device(s) 226. Thus, for example, a USB port may be used to provide input to the computer 202 and to output information from the computer 202 to an output device 230.

An output adapter 232 is provided to illustrate that there are some output devices 230 like monitors, speakers, and printers, among other output devices 230, which are accessible via the output adapters 232. The output adapters 232 include, by way of illustration and not limitation, video and sound cards that provide a means of connection between the output device 230 and the system bus 208. It can be noted that other devices and/or systems of devices provide both input and output capabilities, such as remote computer(s) 234.

The computer 202 may be a server within a networking environment (e.g., the networking environment 100), and may include logical connections to one or more remote computers, such as remote computer(s) 234. The remote computer(s) 234 may be client systems configured with web browsers, PC applications, mobile phone/device applications, and the like. The remote computer(s) 234 can be a personal computer, a server, a router, a network PC, a workstation, a microprocessor based appliance, a mobile device, a peer device or other common network node and the like, and typically includes many or all of the elements described relative to the computer 202. For purposes of brevity, the remote computer(s) 234 are illustrated with a memory storage device 236. The remote computer(s) 234 are logically connected to the computer 202 through a network interface 238, and physically connected to the computer 202 via a communication connection 240.

Network interface 238 encompasses wired and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 240 refers to the hardware and/or software employed to connect the network interface 238 to the system bus 208. While communication connection 240 is shown for illustrative clarity inside the computer 202, it can also be external to the computer 202. The hardware and/or software for connection to the network interface 238 may include, for example, internal and external technologies such as mobile phone switches, modems including regular telephone grade modems, cable modems and DSL modems, ISDN adapters, and Ethernet cards.

Figure 3:
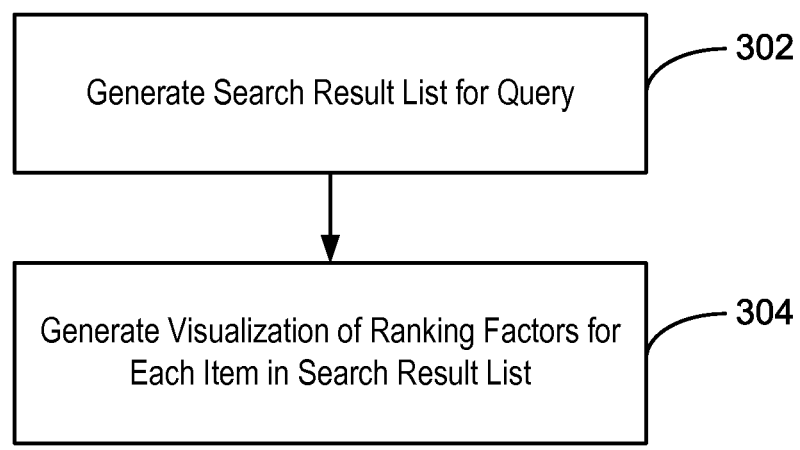
FIG. 3 is a process flow diagram of a method for visualizing ranking factors for items in a search result list.

FIG. 3 is a process flow diagram of a method 300 for visualizing ranking factors for items in a search result list.

The method 300 may be implemented by any suitable type of computing system that is capable of executing a query and returning a search result list in accordance with embodiments described herein. For example, the method 300 may be implemented within the networking environment 100 of FIG. 1 and/or the computing environment 200 of FIG. 2. In various embodiments, the method 300 is used to provide the user with information regarding the content and ordering of a search result list that is generated when a particular query is executed in response to input by the user. Furthermore, the method 300 may provide the user with the capability to modify the manner in which the content and ordering of the search result list is determined such that items that are more relevant to the user are presented in the search result list.

The method 300 begins at block 302, at which a search result list is generated for a query. The query may include search terms or keywords input by a user of the computing system. The search result list may be generated by identifying a number of items that match the search terms or keywords within the query and performing ranking calculations for the items to determine the items that are to be shown in the search result list as well as the ordering of the items in the search result list.

In various embodiments, each item corresponds to one or more ranking factors, and each ranking factor has an assigned weight that specifies the importance of the ranking factor with relation to the other ranking factors. Further, in various embodiments, the ranking calculations for the items are performed based on the weight of each ranking factor. Specifically, the rank of each item may be calculated by combining the weights of the ranking factors for the item to determine an overall ranking score, and the items may then be listed in descending order by rank in the search result list. Exemplary ranking factors that may be used according to embodiments described herein are shown below with respect to Table 1.

TABLE 1

Exemplary Ranking Factors

| RANKING FACTOR TYPE | RANKING FACTOR DESCRIPTION |
|---|---|
| Familiarity | Has the current user accessed the item recently? |
| Popularity | Has the item been accessed, edited, or shared frequently? How many links are there to the item? |
| Freshness | Has the item been edited or shared recently? |
| Authority | Is the item close to other authoritative items based on URL-path or click distance? Is the person or group considered an authority on the subject associated with the item? |
| Social Cues | Are the user's colleagues or groups associated with the item? |
| Personalness | Does the user own the item? Is it private, or do others have access to it? |
| Date | When was the item created? |
| Match | How well does the query match the item? Do links to the item contain the query keywords? |

It is to be understood that Table 1 is not intended to indicate that all the ranking factors shown in Table 1 are to be used according to embodiments described herein. Moreover, any number of additional ranking factors not shown in Table 1 may also be used according to embodiments described herein, depending on the details of the specific implementation. For example, ranking factors corresponding to specific websites or applications may also be used.

Further, each of the ranking factors may be a single ranking factor, or may be a group of ranking factors. For example, the popularity of an item may be determined according to a number of different techniques, and the popularity results obtained from the different techniques may be combined into a single popularity ranking factor for the item.

At block 304, a visualization of the ranking factors for each item (or group of items) in the search result list is generated. In some embodiments, generating the visualization includes displaying a graphical symbol, such as an icon, or a label corresponding to each ranking factor for each item adjacent to the item in the search result list. In other embodiments, generating the visualization includes displaying a graph, such as a bar graph or a pie graph, corresponding to ranking factors for item adjacent to the item in the search result list. In addition, the graphical symbols, labels, or graphs may be highlighted such that ranking factors that contribute more to the overall ranking score of the item are more strongly emphasized in the visualization than ranking factors that contribute less to the overall ranking score of the item. For example, ranking factors that contribute more to the overall ranking score of the item may be more highly saturated in the visualization and, thus, may stand out more than ranking factors that contribute less to the overall ranking score of the item.

According to embodiments described herein, the ranking factors that are to be included in the visualization may be determined based on a visibility threshold for each ranking factor. For example, the visibility threshold for a ranking factor may be any value between 0 and 1. If the visibility threshold is set to 1, the ranking factor will not appear in the visualization unless the actual contribution of the ranking factor to the ranking score for the item is a maximum value. For example, if the visibility threshold for the freshness ranking factor is set to 1, the freshness ranking factor will only be shown for an item if the item is entirely new.

In various embodiments, the visibility thresholds for the ranking factors are tunable. The visibility threshold for each ranking factor may be automatically tuned based on information relating to the specific user or the specific query, or may be tuned in response to input by the user. Tuning the visibility thresholds for the ranking factors changes the visibility of each ranking factor within the visualization but does not change the actual ranking of the items within the search result list. Further, in various embodiments, the weight of any of the ranking factors may be tuned in response to input by the user. The ranking calculations may then be re-performed to determine the items to be shown in the search result list as well as the ordering of the items.

The process flow diagram of FIG. 3 is not intended to indicate that the blocks of the method 300 are to be executed in any particular order, or that all of the blocks are to be included in every case. Further, any number of additional blocks not shown in FIG. 3 may be included within the method 300, depending on the details of the specific implementation.

Figure 4:
FIG. 4 is a schematic showing exemplary icons for visualizing ranking factors that may be used according to embodiments described herein.
Figure 4:
Figure 4:
Figure 4:
Figure 4:
Figure 4:
Figure 4:
Figure 4:

FIG. 4 is a schematic showing exemplary icons 400 for visualizing ranking factors that may be used according to embodiments described herein. The icons 400 shown in FIG. 4 correspond to the ranking factors presented in Table 1. However, it is to be understood that the ranking factors presented in Table 1 are not limited to the icons 400 shown in FIG. 4. Rather, any variation of the icons 400 shown in FIG. 4 may be used to visualize the ranking factors. Further, the ranking factors may be visualized as labels or graphs rather than as icons.

Figure 5:
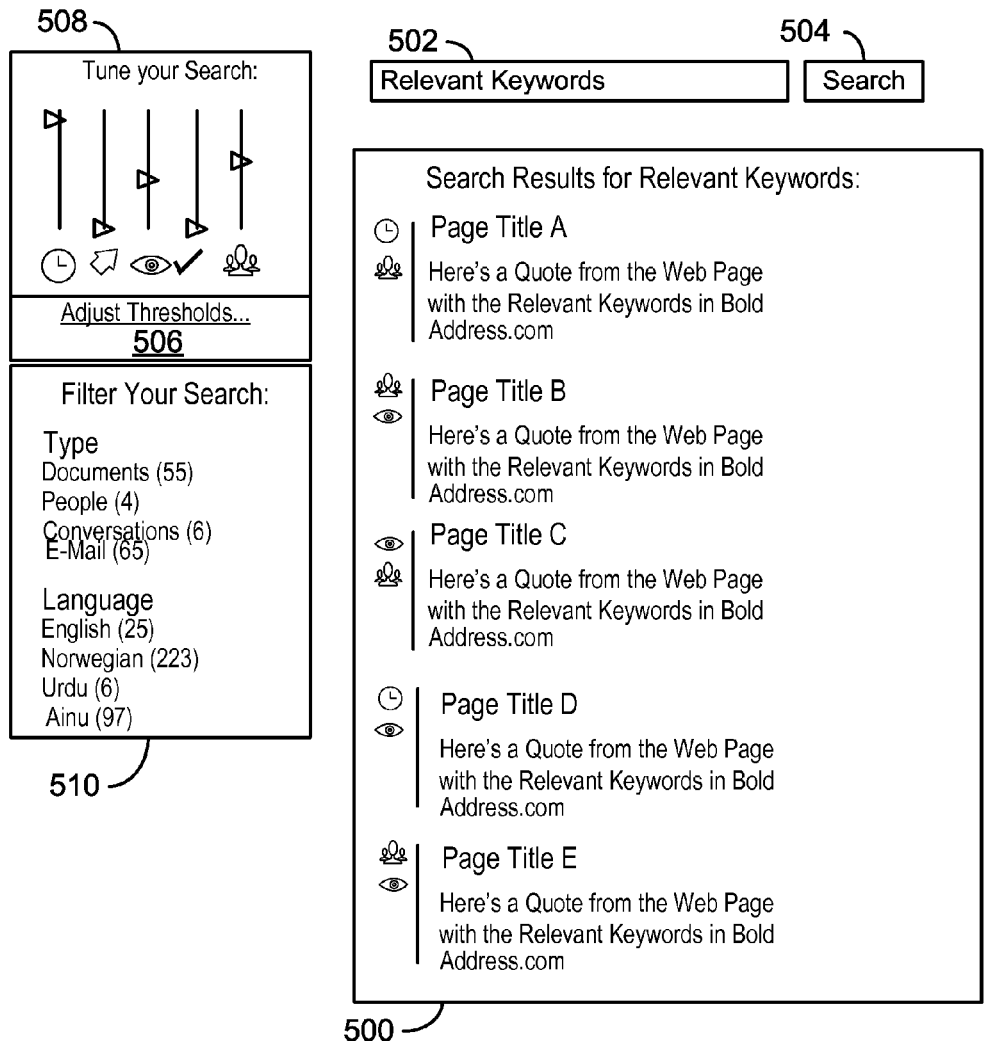
FIG. 5 is a schematic showing a search result list indicating ranking factors for each item within the search result list.

FIG. 5 is a schematic showing a search result list 500 indicating ranking factors for each item within the search result list. As shown in FIG. 5, the user may type one or more relevant keywords for a query into a search box 502. The query may then be executed in response to the user clicking on a search icon 504, or executed for every key pressed on the keyboard as the user is typing in the query, or by clicking on pictures/photos/images, or through speech, or other means of non-textual search. In addition, a query may be executed automatically when a page is initially displayed to the user.

In response to the execution of the query, the search result list 500 may be generated. As shown in FIG. 5, the title (e.g., the page title), a short snippet of content (e.g., a quote from the Web page with relevant keywords in bold), and the URL (e.g., "address.com") for each item may be displayed in the search result list 500. Further, according to embodiment described herein, the ranking factors for each item in the search result list 500 are displayed. The ranking factors may be highlighted (e.g., displayed with differing degrees of saturation) for each item based on the visibility threshold for each ranking factor and the amount that each ranking factor contributes to the overall ranking score of the item.

Figure 6:
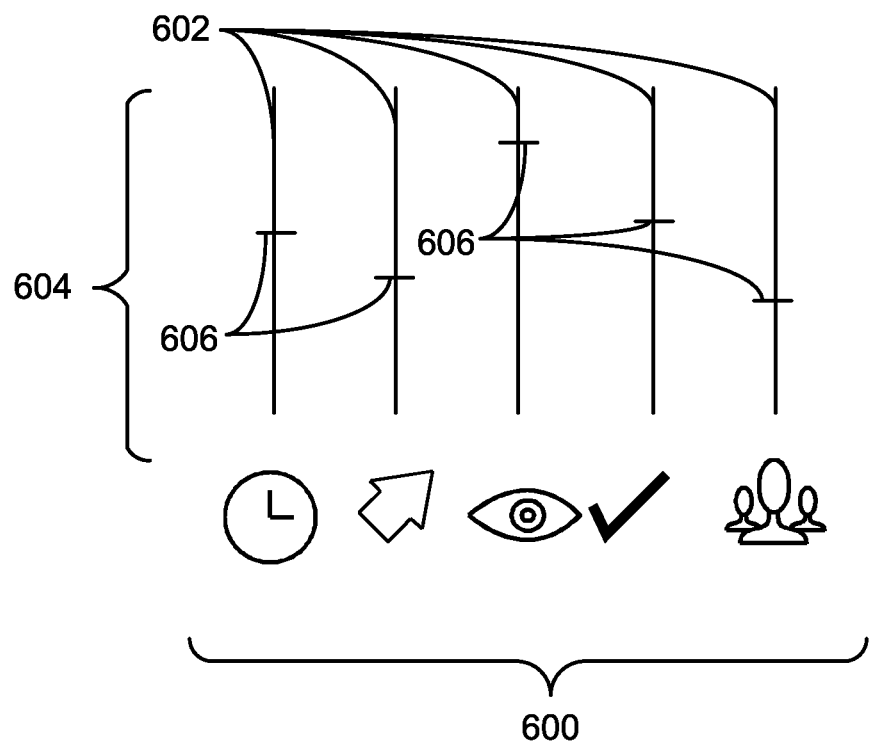
FIG. 6 is a schematic showing the visibility threshold tuning controls for the ranking factors used to generate the search result list of FIG. 5.

In various embodiments, the user may tune the visibility thresholds for the ranking factors using visibility threshold tuning controls 506, as discussed further with respect to FIG. 6. Tuning the visibility thresholds for the ranking factors may change the visibility of the ranking factor icons in the search result list. In addition, in various embodiments, the user may tune the weights for the ranking factors using weight tuning controls 508. Tuning the weights for the ranking factors may change the actual ordering of the items in the search result list.

Further, in some embodiments, the user may use search filter controls 510 to filter the search result list according to various different item characteristics. For example, the search result list may be filtered according to the type of each item (e.g., document, people, conversations, email, or the like) or the language of each item (e.g., English, Norwegian, Urdu, Ainu, or the like).

FIG. 6 is a schematic showing the visibility threshold tuning controls 506 for the ranking factors used to generate the search result list 500 of FIG. 5. The visibility threshold tuning controls 506 may include icons 600 corresponding to a number of relevant ranking factors for the particular query. The visibility threshold tuning controls 506 may also include a slider bar 602 corresponding to each icon 600. In various embodiments, the user may increase or decrease a visibility threshold 604 for an icon 600 by sliding an indicator 606 within the slider bar 602 corresponding to the icon 600 up or down.

Figure 7:
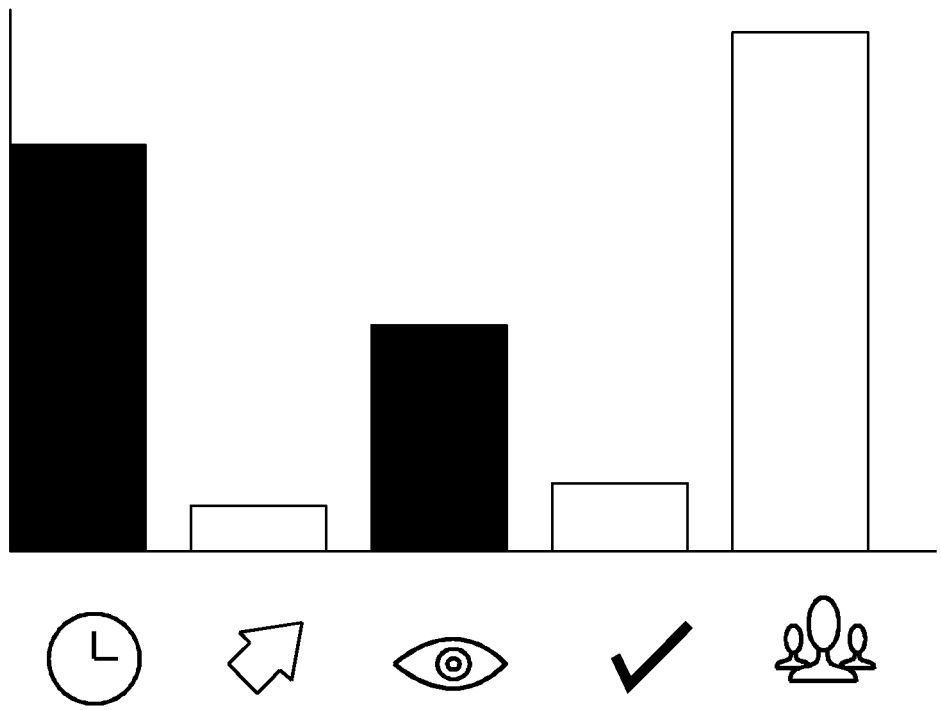
FIG. 7 is a bar graph showing an exemplary visualization of ranking factors for a particular item in a search result list.

FIG. 7 is a bar graph 700 showing an exemplary visualization of ranking factors for a particular item in a search result list. The bar graph 700 may show all the ranking factors that contribute to the ranking score of the item, but may highlight ranking factors that exceed their corresponding visibility thresholds.

Figure 8:
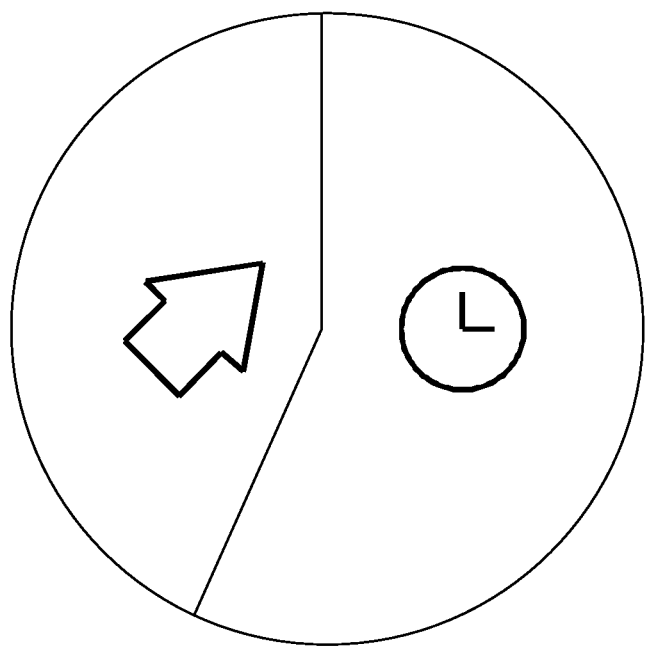
FIG. 8 is a pie graph showing an exemplary visualization of ranking factors for a particular item in a search result list.

FIG. 8 is a pie graph 800 showing an exemplary visualization of ranking factors for a particular item in a search result list. Similarly to the bar graph 700 of FIG. 7, the pie graph 800 may show all the ranking factors that contribute to the ranking score of the item, but may highlight ranking factors that exceed their corresponding visibility thresholds.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for visualizing ranking factors for items in a search result list, comprising:
   generating, using a processing device, a search result list for a query, the search result list including a plurality of items, each item being associated with at least one of a plurality of ranking factors;
   associating, using the processing device, the plurality of ranking factors with a corresponding plurality of visualizations;
   associating, using the processing device, each of the plurality of ranking factors with a corresponding plurality of weights;
   generating, using the processing device, an ordered plurality of items by ordering the plurality of items based at least in part on the plurality of ranking factors, the plurality of weights, or a combination thereof;
   determining, using the processing device, a visibility threshold for each of the plurality of ranking factors, the visibility threshold determining a visibility of each of the plurality of ranking factors; and
   displaying, using the processing device, the ordered plurality of items and the corresponding plurality of visualizations based at least in part on the visibility threshold for each of the plurality of ranking factors on a display.

2. The method of claim 1, wherein each of the plurality of visualizations includes a graphical symbol, label, or icon.

3. The method of claim 2, further comprising tuning, using the processing device, the visibility threshold for any of the plurality of ranking factors based at least in part on input by a user.

4. The method of claim 2, further comprising at least partially highlighting, using the processing device, the at least one of the plurality of visualizations corresponding to at least one of the plurality of ranking factors based at least in part on a contribution of the at least one ranking factor to a ranking score for at least one of the ordered plurality of items.

5. The method of claim 1, further comprising performing, using the processing device, ranking calculations based at least in part on the plurality of weights associated with the plurality of ranking factors.

6. The method of claim 5, further comprising:
   modifying, using the processing device, any of the plurality of weights of any of the plurality of ranking factors in response to input by a user; and
   regenerating, using the processing device, the ordered plurality of items based at least in part on modifying any of the plurality of weights.

7. The method of claim 1, further comprising displaying, using the processing device, each of the plurality of visualizations in close proximity to each of the ordered plurality of items.

8. The method of claim 1, further comprising automatically tuning, using the processing device, each of the plurality of visibility thresholds based at least in part on the query.

9. The method of claim 1, further comprising generating, using the processing device, a graph corresponding to at least one of the plurality of ranking factors.

10. A computing system for visualizing ranking factors for items in a search result list, comprising:
    a display device;
    a memory device to store instructions; and a processing device to execute the instructions stored in the memory device to:
- generate a search result list in response to a query, the search result list including a plurality of items, each of the plurality of items being associated with at least one of a plurality of ranking factors;
- associate the plurality of ranking factors with a corresponding plurality of visualizations;
- associate each of the plurality of ranking factors with a corresponding plurality of weights;
- generate an ordered plurality of items by ordering the plurality of items based at least in part on the plurality of ranking factors, the plurality of weights, or a combination thereof;
- determine a visibility threshold for each of the plurality of ranking factors, the visibility threshold determining a visibility of each of the plurality of ranking factors; and
- display the visualizations to the user via the display device.

11. The system of claim 10, wherein the processing device executes the instructions stored in the memory device further to include a graphical symbol, label, or icon in each of the plurality of visualizations.

12. The system of claim 10, wherein the processing device executes the instructions stored in the memory device further to generate the ordered plurality of items based at least in part on a ranking score corresponding to each of the plurality of items, the ranking score comprising a combination of the plurality of weights corresponding to the plurality of ranking factors for each of the plurality of items.

13. The system of claim 10, wherein the processing device executes the instructions stored in the memory device further to:
- modify any of the plurality of weights of any of the plurality of ranking factors in response to input by the user; and
- regenerate the ordered plurality of items based at least in part on modifying any of the plurality of weights.

14. The system of claim 10, wherein the processing device executes the instructions stored in the memory device further to display each of the plurality of visualizations in close proximity to each of the ordered plurality of items.

15. The system of claim 10, wherein the processing device executes the instructions stored in the memory device further to tune the visibility threshold for any of the plurality of ranking factors based at least in part on user input.

16. The system of claim 10, wherein the processing device executes the instructions stored in the memory device further to automatically tune each of the plurality of visibility thresholds based at least in part on the query.

17. One or more computer-readable storage media to store computer-readable instructions, the computer-readable instructions providing a system for visualizing ranking factors for items in a search result list, that when executed by one or more processing devices, cause the one or more processing devices to:
- generate a search result list in response to a query, the search result list including a plurality of items, each of the plurality of items being associated with at least one of a plurality of ranking factors; and
- associate the plurality of ranking factors with a corresponding plurality of visualizations;
- associate each of the plurality of ranking factors with a corresponding plurality of weights;
- generate an ordered plurality of items by ordering the plurality of items based at least in part on the plurality of ranking factors, the plurality of weights, or a combination thereof;
- determine a visibility threshold for each of the plurality of ranking factors, the visibility threshold determining a visibility of each of the plurality of ranking factors; and
- display the visualizations to the user via the display device.

18. The one or more computer-readable storage media of claim 17, wherein the computer-readable instructions, when executed by the one or more processing devices, cause the one or more processing devices to tune any of the plurality of visibility thresholds for any of the plurality of ranking factors based at least in part on user input.

19. The one or more computer-readable storage media of claim 17, wherein the computer-readable instructions, when executed by the one or more processing devices, cause the one or more processing devices to:
- modify any of the plurality of weights of any of the plurality of ranking factors in response to input by the user; and
- reorder the plurality of items based at least in part on modifying any of the plurality of weights.

* * * * *